US008843815B2

United States Patent
Yang et al.

(10) Patent No.: US 8,843,815 B2
(45) Date of Patent: Sep. 23, 2014

(54) SYSTEM AND METHOD FOR AUTOMATICALLY EXTRACTING METADATA FROM UNSTRUCTURED ELECTRONIC DOCUMENTS

(75) Inventors: Sheng-Wen Yang, Beijing (CN); Yuhong Xiong, Mountain View, CA (US); Wei Liu, Beijing (CN)

(73) Assignee: Hewlett-Packard Development Company, L. P., Houston, TX (US)

( * ) Notice: Subject to any disclaimer, the term of this patent is extended or adjusted under 35 U.S.C. 154(b) by 267 days.

(21) Appl. No.: 13/258,484

(22) PCT Filed: Jan. 18, 2010

(86) PCT No.: PCT/CN2010/070243
§ 371 (c)(1),
(2), (4) Date: Sep. 22, 2011

(87) PCT Pub. No.: WO2011/085562
PCT Pub. Date: Jul. 21, 2011

(65) Prior Publication Data
US 2012/0278705 A1 Nov. 1, 2012

(51) Int. Cl.
*G06F 17/00* (2006.01)
*G06F 17/27* (2006.01)
*G06F 17/30* (2006.01)

(52) U.S. Cl.
CPC ...... *G06F 17/2745* (2013.01); *G06F 17/30722* (2013.01)
USPC .......................................................... 715/200

(58) Field of Classification Search
USPC .................................. 715/200, 212
See application file for complete search history.

(56) References Cited

U.S. PATENT DOCUMENTS

| 5,963,919 | A  | * | 10/1999 | Brinkley et al. | 705/28 |
| 6,279,018 | B1 | * | 8/2001  | Kudrolli et al. | 715/234 |
| 6,289,342 | B1 | * | 9/2001  | Lawrence et al. | 1/1 |
| 7,016,939 | B1 | * | 3/2006  | Rothwell et al. | 709/206 |
| 7,209,954 | B1 | * | 4/2007  | Rothwell et al. | 709/206 |
| 7,802,184 | B1 | * | 9/2010  | Battilana | 715/257 |
| 7,848,918 | B2 | * | 12/2010 | Li et al. | 704/9 |
| 8,135,728 | B2 | * | 3/2012  | Yih et al. | 707/765 |
| 8,161,088 | B2 | * | 4/2012  | Kloeckner | 708/145 |
| 2002/0194026 | A1 | * | 12/2002 | Klein et al. | 705/2 |

(Continued)

FOREIGN PATENT DOCUMENTS

CN  1687926  10/2005

OTHER PUBLICATIONS

Giuffrida et al., Knowledge-Based Metadata Extraction from PostScript Files, ACM 2000, pp. 77-84.*

(Continued)

*Primary Examiner* — Cong-Lac Huynh (57) ABSTRACT

A system and method for automatically extracting meta data from unstructured electronic documents is disclosed. In one embodiment, the unstructured electronic document is converted into a plain text document. Further, a document header of the unstructured electronic document is extracted from the plain text document using a rule-based document header extractor, where the rule-based document header extractor may be based on a rule that includes determining a ratio of a number of words with their initial letters capitalized in a text line over a total number of words in the text line in the plain text document. Moreover, meta data is extracted from the extracted document header using a heuristic approach.

11 Claims, 7 Drawing Sheets

(56) References Cited

U.S. PATENT DOCUMENTS

| | | | |
|---|---|---|---|
| 2002/0198859 A1* | 12/2002 | Singer et al. | 707/1 |
| 2005/0027781 A1* | 2/2005 | Curry et al. | 709/200 |
| 2007/0011183 A1* | 1/2007 | Langseth et al. | 707/101 |
| 2007/0074131 A1* | 3/2007 | Assadollahi | 715/816 |
| 2008/0114757 A1* | 5/2008 | Dejean et al. | 707/6 |
| 2009/0094267 A1 | 4/2009 | Muguda | |
| 2010/0042424 A1* | 2/2010 | Turakhia | 705/1 |
| 2010/0070584 A1* | 3/2010 | Chen et al. | 709/206 |
| 2011/0153647 A1* | 6/2011 | Hoellwarth | 707/769 |
| 2011/0161333 A1* | 6/2011 | Langseth et al. | 707/755 |
| 2011/0166898 A1* | 7/2011 | Zarrow | 705/5 |
| 2011/0196921 A1* | 8/2011 | Sylthe | 709/203 |
| 2012/0054135 A1* | 3/2012 | Salaka et al. | 706/13 |
| 2012/0072204 A1* | 3/2012 | Nasri et al. | 704/9 |
| 2012/0150835 A1* | 6/2012 | Bobick et al. | 707/706 |
| 2013/0051538 A1* | 2/2013 | Qiu et al. | 379/88.12 |

OTHER PUBLICATIONS

Han et al., Automatic Document Metadata Extraction using Support Vector Machines, IEEE 2003, pp. 1-12.*

Yin et al., Metadata Extraction from Bibliographies Using Bigram Hmm, Google 2004, pp. 310-319.*

Lu et al., Automatic Categorization of Figures in Scientific Documents, ACM 2006, pp. 129-138.*

Brill et al., an Analysis of the AskMSR Question-Answering System, ACM 2002, pp. 257-264.*

* cited by examiner

SYSTEM AND METHOD FOR AUTOMATICALLY EXTRACTING METADATA FROM UNSTRUCTURED ELECTRONIC DOCUMENTS

BACKGROUND

A fundamental step in automatic document management applications is to disaggregate each document into its basic constituents, so a reader can effectively index, search and disseminate the document. For example, in a scientific paper, metadata such as names of authors, affiliations, title and electronic mail identifiers (email IDs) play a fundamental role in consolidating the knowledge of the reader. However, majority of the documents today are in unstructured formats and the documents lack metadata because the authors, typically, are focused on creating the document content and not the metadata. Unfortunately, the automatic document management applications cannot digest unstructured information without lots of human intervention, which means majority of business information cannot be economically employed in automated business processes or in business intelligence. Typically, manually annotating the documents for metadata may not be practical, because the number of documents to be edited can be significantly large, labor intensive, time consuming, and expensive. Furthermore, manual editing may be prone to errors.

Therefore, it is important and useful to extract such metadata automatically in an efficient and accurate manner. Automatic extraction of metadata may be difficult. Firstly, the layout of the documents may vary significantly, thereby making it difficult to extract the metadata according to predefined layouts. Secondly, format of the documents may also significantly vary requiring them to be transformed into some standard document format from which the metadata may be easily extracted. Thirdly, such transformation into a standard document format may lead to errors and may result in an unformatted content. For example, if a plain text is adapted to be the standard document format, and a portable document format (PDF) document is converted to the plain text, it is common for a single line text to get divided into multiple text lines or a Unicode symbol to get decoded into messy codes. This is particularly true for documents produced using older versions of the PDF.

To address the above-described problems, one category may automatically extract metadata from documents with fixed layouts and well-defined and formatted text (similarly formatted documents), for example, research papers from certain journals or proceedings, by matching the text with specific patterns. However, this type of automatic metadata extraction can handle a certain limited type of documents and typically may not be robust to errors in the text introduced by the document conversion process, such as the one described above.

The second category may use various supervised machine learning techniques to automatically extract metadata from documents. One method uses image processing, and another method uses text classification and yet another method uses sequence labeling. Typically, all of these methods may require preparing a training data set, collecting and labeling training samples, defining a set of features, learning a model and applying the learnt model on testing samples. However, these methods may heavily depend on the distribution of training samples, the selected features, and the ability of the model.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for automatically extracting metadata from unstructured electronic documents is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

In the document, the term "unstructured electronic document" generally refers to any one of a number of specific genres, including presentations, book chapters, technical papers, brochures, reports, letters and the like. Further, the term "unstructured electronic document" refers to an electronic document in a complex document format, such as word processor, spreadsheet, power point presentation, PDF, graphics software and so on.

Figure 1:
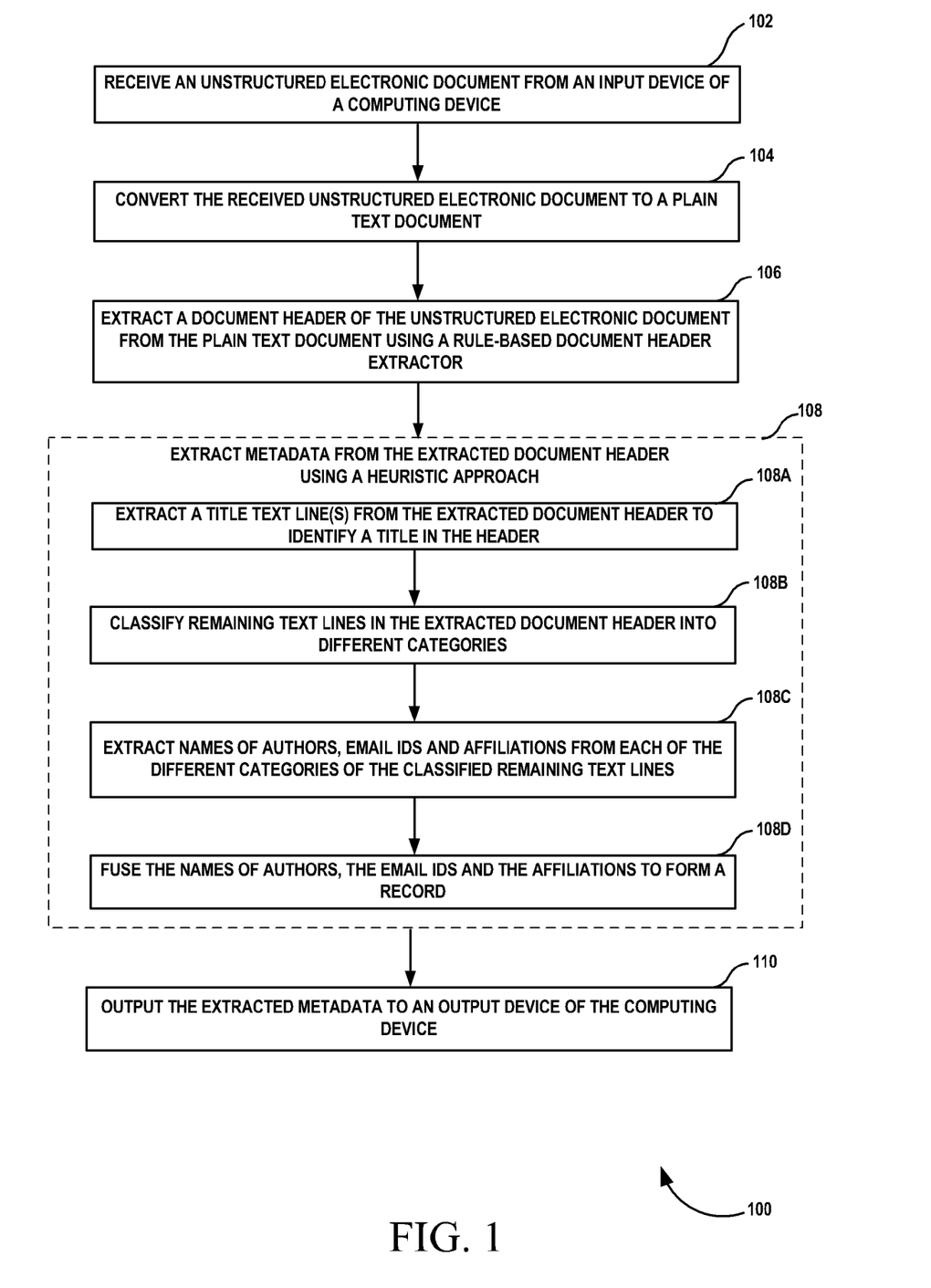
FIG. 1 illustrates a computer implemented flow diagram of an exemplary method for automatically extracting metadata from an unstructured electronic document, according to one embodiment.

FIG. 1 illustrates a computer implemented flow diagram 100 of an exemplary method for automatically extracting metadata from an unstructured electronic document, according to one embodiment. At step 102, an unstructured electronic document is received from an input device of a computing device. For example, the unstructured electronic document may be in a format including but not limited to a word processor format, a spreadsheet format, a power point presentation format, a PDF and a graphics software format.

At step 104, the received unstructured electronic document is converted into a plain text document. In one embodiment, the received unstructured electronic document may be first converted into an intermediate document format, such as a PDF. The unstructured electronic document in the intermediate document format may then be converted into a plain text document. The plain text document thus obtained may include text with encoded text styles and text sizes.

At step 106, a document header of the unstructured electronic document is extracted from the plain text document using a rule-based document header extractor. In one example embodiment, it is determined which of a text line(s) in the plain text document belongs to the document header using the rule-based document header extractor. In some embodiments, the rule-based document header extractor may be based on a rule that includes determining a ratio of a number of words with their initial letters capitalized in the text line(s) over a total number of words in the text line(s). Based on the above rule, the document header is identified and extracted from the plain text document. The process of identifying and extracting the document header is described in greater detail in FIG. 2.

At step 108, metadata is extracted from the extracted document header using a heuristic approach. For example, the metadata may include title, name(s) of author(s), electronic mail identifier(s) (email ID(s)), affiliation(s) and the like. In some example embodiments, the heuristic approach may be based on a pattern-based technique such as a fine-grained pattern-based technique, and a prior knowledge associated with the metadata to be extracted. According to an embodiment of the present invention, the metadata in the extracted document header may be extracted by performing steps 108A-D. At steps 108A, a title text line(s) is extracted from the extracted document header to identify a title in the document header of the plain text document. In one example embodiment, the title text line(s) may be extracted based on eye catching style characteristics, such as a font size of the text line(s), a bold font type of the text line(s), and a position of the text line(s) in the document header. The title text line(s) can be extracted based on the eye catching style characteristics as the text line(s) in the converted plain text document includes encoded text styles and text sizes.

For example, in a well formatted unstructured electronic document, such as journal articles, conference papers and the like, a title text line(s) may be centrally aligned and may have a large font size, and a bold font type. It can be noted that, a plain text document obtained by converting the well formatted unstructured electronic document may have the title text line(s) with encoded large font size, and bold font type. Thus, based on the encoded large font size, bold font type and position, the title text line(s) can be extracted from the document header in the plain text document.

However, in case of an ill-formatted unstructured electronic document, the title text line(s) may be extracted based on whether the text line(s) is in the beginning of the extracted document header, whether the text line(s) is a single text line or less than or equal to a predetermined number of title text lines. Further, the titles text line(s) position is verified prior to extracting the title text line(s) by determining whether the text line(s) is followed by author information text lines, such as names of authors text line, email IDs text line, affiliations text line, having different font style(s) and font size(s). Also, if the distance between the original title text line(s) and the author information text lines is large, then a position of new title text line(s) can be searched after the original title text line(s) and before the author information text line(s). The process of extracting the title text line(s) and declaring a title based on the extracted title text line(s) is described in greater detail in FIG. 4.

At step 108B, remaining text lines in the extracted document header are classified into different categories. In some embodiments, the remaining text lines may be classified into the different categories based on a pattern-based technique and a prior knowledge. In these embodiments, the different categories may include but not limited to a names of authors text line, an email IDs text line, an affiliations text line, a names of authors followed by email IDs text line, a names of authors followed by affiliations text line, a names of authors followed by date text line, and a noise text line.

For example, the names of authors text line may be a text line having names of authors. The email IDs text line may be a text line having email IDs associated with the authors. The affiliations text line may be a text line having affiliations associated with the authors. The noise text line may be a text line mistaken as the text line associated with the document header of the unstructured electronic document. It can be noted that, the pattern-based technique may be used to identify the email IDs text line, a date text line and the like, while the prior knowledge may be used to identify the names of authors text line, the affiliations text line and the like. For example, terms such as university, department, lab and so on are commonly used in the affiliations text line and hence may be used to identify the affiliations text line. The process of classifying the remaining text lines into different categories is described in greater detail in FIG. 5.

At step 108C, names of authors, email IDs and affiliations are extracted from each of the different categories of the classified remaining text lines. In one embodiment, the names of authors text line is scanned and the names of authors separated by punctuation marks such as commas, semicolons, and white spaces are extracted from the names of authors text line. Further, the names of authors may be normalized in the form of a given name followed by a surname. For example, a name of author extracted from a names of authors text line is 'Smith, John', the name of author may be normalized to 'John Smith'.

Furthermore, the extracted names of authors are validated by assigning a score to each name of author extracted from the names of authors text line based on a prior knowledge. For example, the prior knowledge may include whether the extracted names of authors belong to a list to common given names, a list of common surnames, a list of common place names, a list of excluded words, a dictionary including part-of-speech words and the like. The process of assigning a score to each name of author extracted from the names of authors text line is described in greater detail in FIG. 6.

The affiliations associated with the names of authors are extracted by merging multiple continuous affiliations text lines into a string representing a complete affiliation. The email IDs text line extraction involves scanning the email IDs text line and extracting the email IDs separated by punctuation marks such as commas, semicolons, and white spaces from the scanned email IDs text line. In case, multiple email IDs share a common hostname and are written in an abbreviated form, then each of the email IDs associated with the common host name is separated and written in a complete form. For example, if an email IDs text line includes '{john, kane,steve}@abc.com', then the email IDs are separated and written in a complete form as 'john@abc.com', 'kane@abc.com', and 'steve@abc.com'.

At step 108D, the extracted names of authors, email IDs and affiliations are fused to form a record, like <name of author, email ID, affiliation>. In one embodiment, the extracted names of authors, email IDs and affiliations are fused by associating each of the extracted names of authors with corresponding affiliations, and each of the extracted names of authors with corresponding email IDs in tuples like <John Smith, John smith@abc.com, University of ABC>. The association between the extracted name of author and affiliation may depend on position information of the extracted name of author and affiliation. For example, given a name of author and its position, for example, a line number, in the document header, an affiliation in close proximity to the name of author is associated with the name of author.

Similarly, the association between the extracted name of author and email ID may depend on the similarity between the extracted name of the author and a user name in the extracted email ID. Given a set of email IDs and names of authors, a similarity score is computed for each of the names of authors in the given set of email IDs and names of authors.

Further, a name of author with a highest similarity score is associated with the email ID. In one exemplary implementation, for computing a similarity score, a name of author and an email ID are converted to a lower case letters and then the name of author is split into a single word. Further, a length of a longest substring between a user name in the email ID and the name of author extracted from the document header is computed. Furthermore, values of length of the longest substring are summed up to calculate the similarity score. At steps 110, the metadata extracted from the document header of the plain text document is outputted to an output device, such as a display device of the computing device.

Figure 2:
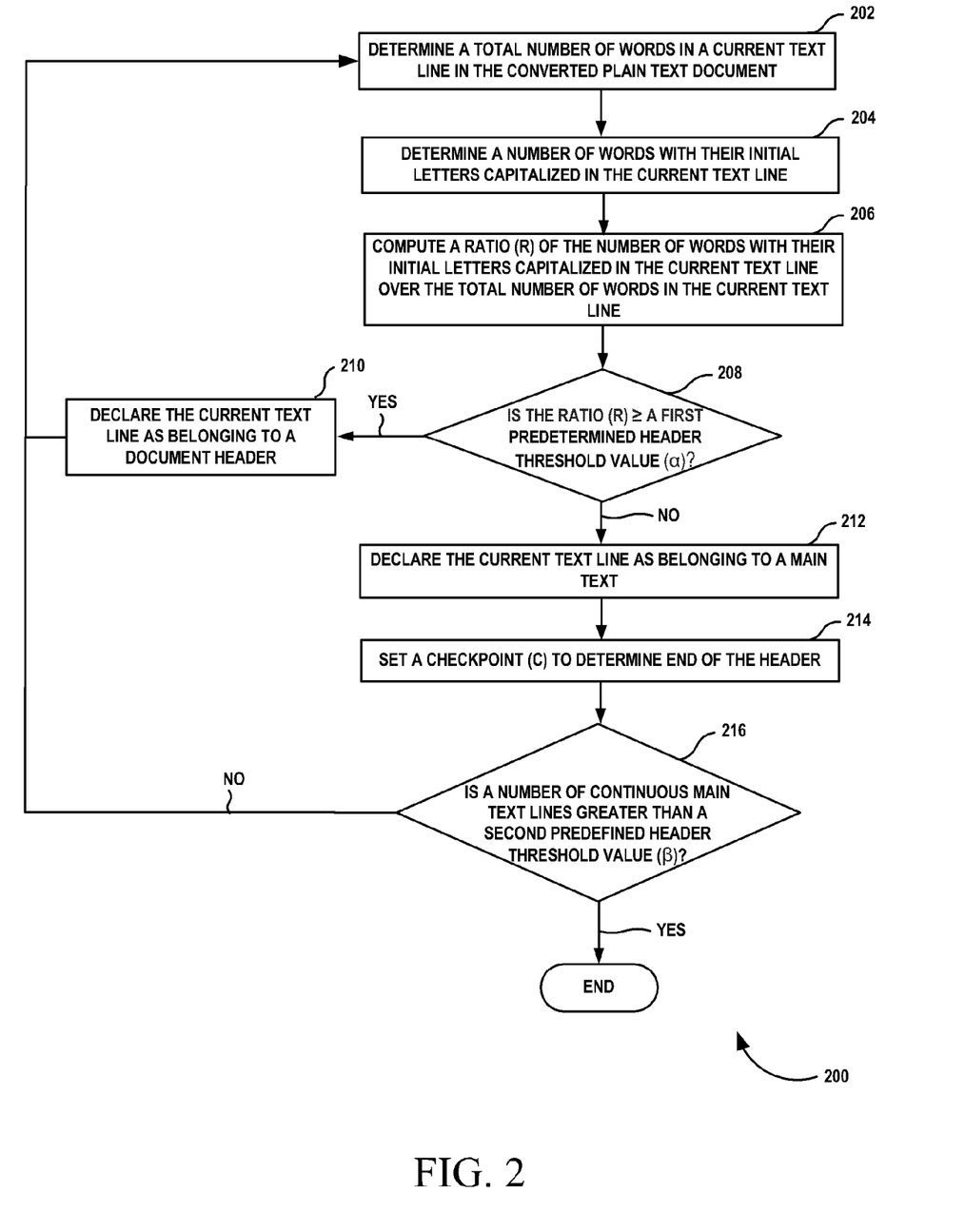
FIG. 2 illustrates a computer implemented flow diagram of an exemplary method for extracting a document header from the unstructured electronic document shown in FIG. 1, according to one embodiment.

FIG. 2 illustrates a computer implemented flow diagram 200 of an exemplary method for extracting the document header from the unstructured electronic document shown in FIG. 1, according to one embodiment. Particularly, FIG. 2 illustrates in detail a process of determining text line(s) belonging to the document header and extracting the document header of the unstructured electronic document from the converted plain text document as illustrated in step 106 of FIG. 1. At step 202, a total number of words in a current text line in the converted plain text document is determined. For example, if a current text line is 'This is an Example Text Line', then a total number of words in the current text line is '6'. At step 204, a number of words with their initial letters capitalized in the current text line is determined. For example, in the current text line 'This is an Example Text Line', a number of words with their initial letter capitalized is '4'. At step 206, a ratio (r) of the number of words with their initial letters capitalized in the current text line over the total number of words in the current text line is computed. For example, the ratio (r) computed for the current text line 'This is an Example Text Line' is 0.66.

At step 208, it is determined whether the computed ratio (r) is greater than or equal to a first predetermined header threshold value ($\alpha$). In other words, at step 208, it is determined whether the current text line belongs to the document header or not. If it is determined that the ratio (r) is greater than or equal to the first predetermined header threshold value ($\alpha$), then the current text line is declared as belonging to the document header at step 210. Consider that, a first predetermined header threshold value ($\alpha$) is 0.6. Further, the ratio (r) computed for the current text line 'This is an Example Text Line' is 0.66. As the ratio (r) is greater than the first predetermined header threshold value ($\alpha$), the current text line 'This is an Example Text Line' is declared as belonging to the document header. Further, upon declaring the current text line as belonging to the document header, steps 202 to 208 are repeated for a next text line in the converted plain text document.

If, at step 208, it is determined that the ratio (r) is less than the first predetermined header threshold value ($\alpha$), then the current text line is declared as belonging to a main text of the unstructured electronic document at step 212. Further, at step 214, a checkpoint (c) is set to determine end of the header. At step 216, it is determined whether the checkpoint (c) is met. In other words, at step 216, it is determined whether a number of continuous main text lines in the converted plain text document is greater than a second predetermined header threshold value ($\beta$). If it is determined that the number of continuous main text lines is greater than the second predetermined header threshold value ($\beta$), then the process of extraction of the document header is terminated, otherwise the steps 202 to 216 are repeated.

Figure 3:
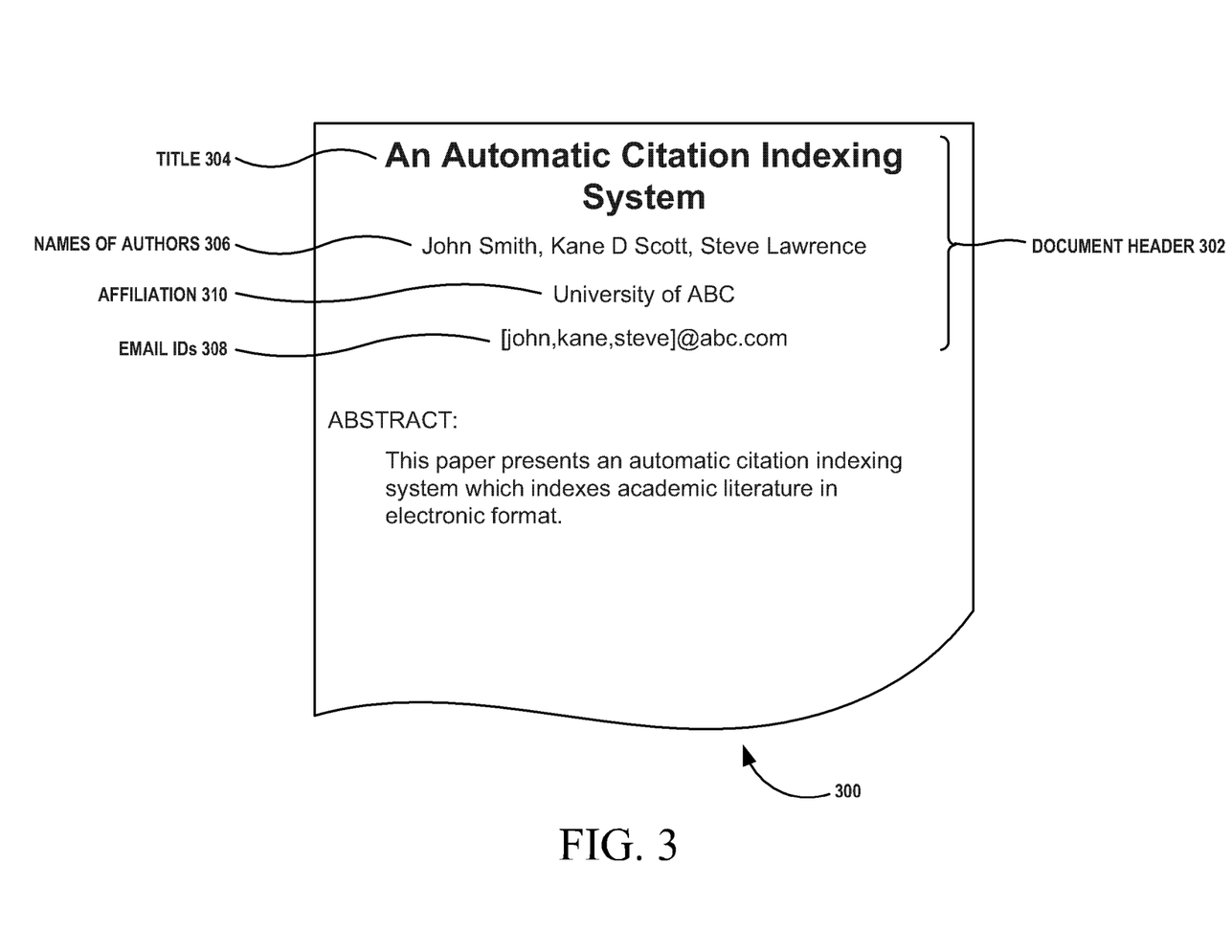
FIG. 3 illustrates an exemplary unstructured document including a document header.

FIG. 3 illustrates an exemplary unstructured document 300 including a document header 302. In FIG. 3, the document header 302 includes metadata such as a title 304, names of authors 306, email IDs 308, and an affiliation 310. For example, in the document header 302, the title 304 is 'An Automatic Citation Indexing System'. The names of authors 306 are 'John Smith', 'Kane D. Scott' and 'Steve Lawrence'. The email IDs 308 are ['john,kane,steve]@abc.com'. The affiliation 310 is 'University of ABC'. According to an embodiment of the present invention, the method of FIG. 1 enables automatic extraction of the document header 302 of the unstructured electronic document 300 and then extraction of the metadata from the extracted document header 302. The metadata extraction is facilitated through analyzing content of the unstructured electronic document 300 based on a set of fine-grained patterns and a prior knowledge. For example, the fine grained patterns may be line-level based patterns, sentence-level based patterns and phrase-level based patterns.

Figure 4:
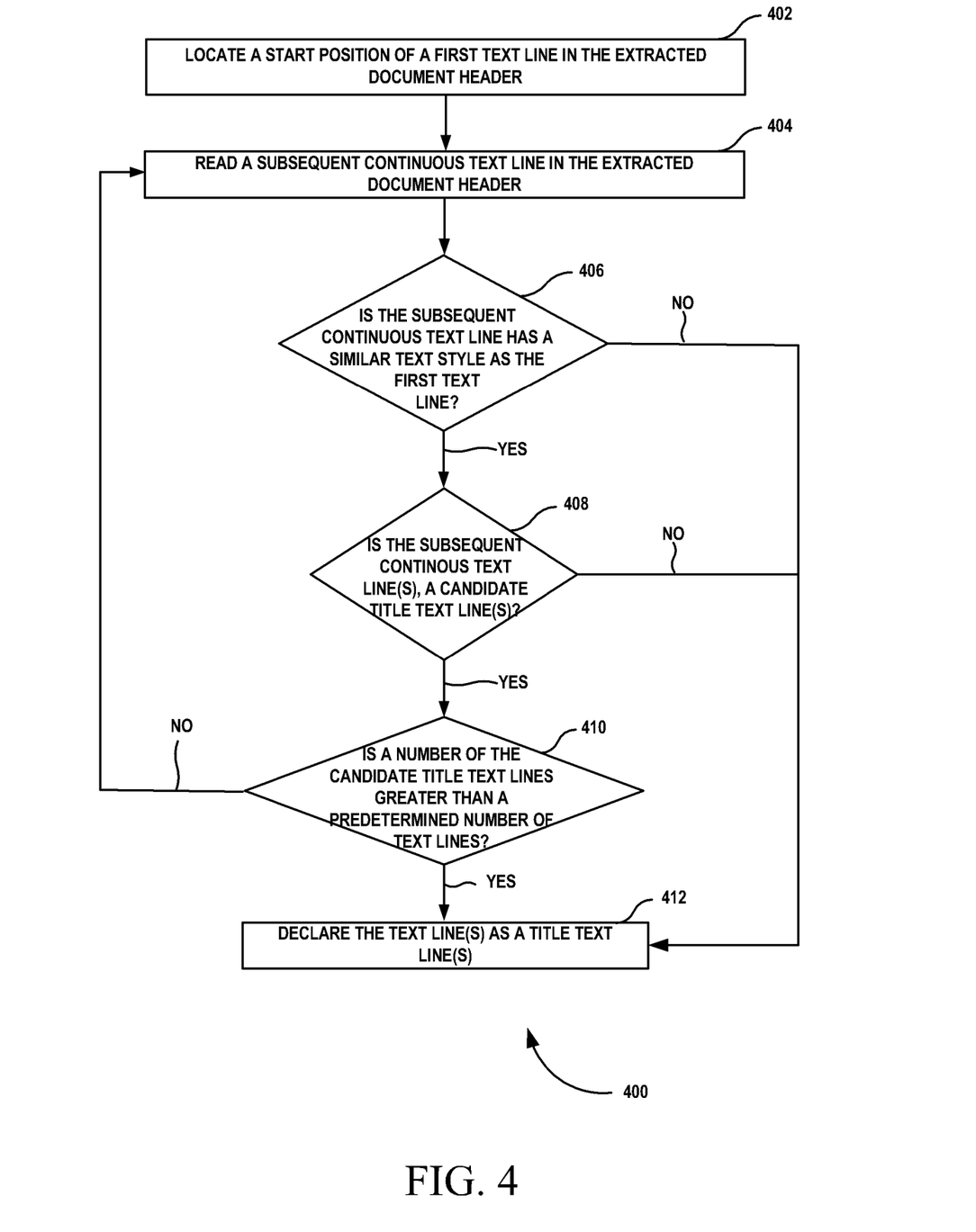
FIG. 4 illustrates a computer implemented flow diagram of an exemplary method for extracting a title from the extracted document header shown in FIG. 2, according to one embodiment.

FIG. 4 illustrates a computer implemented flow diagram 400 of an exemplary method of extracting a title from the extracted document header as shown in FIG. 2, according to one embodiment. Particularly, FIG. 4 illustrates an exemplary process of extracting a title from the extracted document header as illustrated in step 108A of FIG. 1. In one embodiment, a title text line is extracted from the extracted document header based on eye catching style characteristics, such as a font size of the text line, a bold font type of the text line, a position of the text line, and the like. In case, the extracted document header does not include information associated with the eye catching style characteristics of the text lines, then the title text line is extracted based on whether the text line is in the beginning of the extracted document header, whether the text line is a single text line or fewer than a predetermined number of title text lines and the like.

At step 402, a start position of a first text line is located in the extracted document header. In one embodiment, a start position of a first text line with a bigger font size is located in the extracted document header. If the text style information is not available, then in another embodiment, a start position of a first text line of the document header is located. At step 404, a subsequent continuous text line in the extracted document header is read. At step 406, it is determined whether the subsequent continuous text line has a similar text style as the first text line. If it determined that the subsequent continuous text line has similar text style as the first text line, then step 408 is performed, else the first text line is declared as a title text line at step 412. At step 408, it is determined whether the subsequent continuous text line(s) is a candidate title text line(s). In other words, it is determined whether the subsequent continuous text line(s) does not include names of authors text line(s), email IDs text line(s) and/or affiliations text line(s).

If, at step 408, the candidate title text line(s) are determined, then step 410 is performed, else the first text line is declared as a title text line at step 412. At step 410, it is determined whether the number of candidate title text lines is greater than a predetermined number of title text lines. This is determined to avoid inclusion of non-title text lines as the candidate title text lines. If the number of the candidate title text lines is greater than a predetermined number of title text lines, then the candidate title text lines in the extracted document header are declared as title text lines at step 412. If the number of the candidate title text lines is less than the predetermined number of title text lines, then steps 404 to 410 are repeated.

Figure 5:
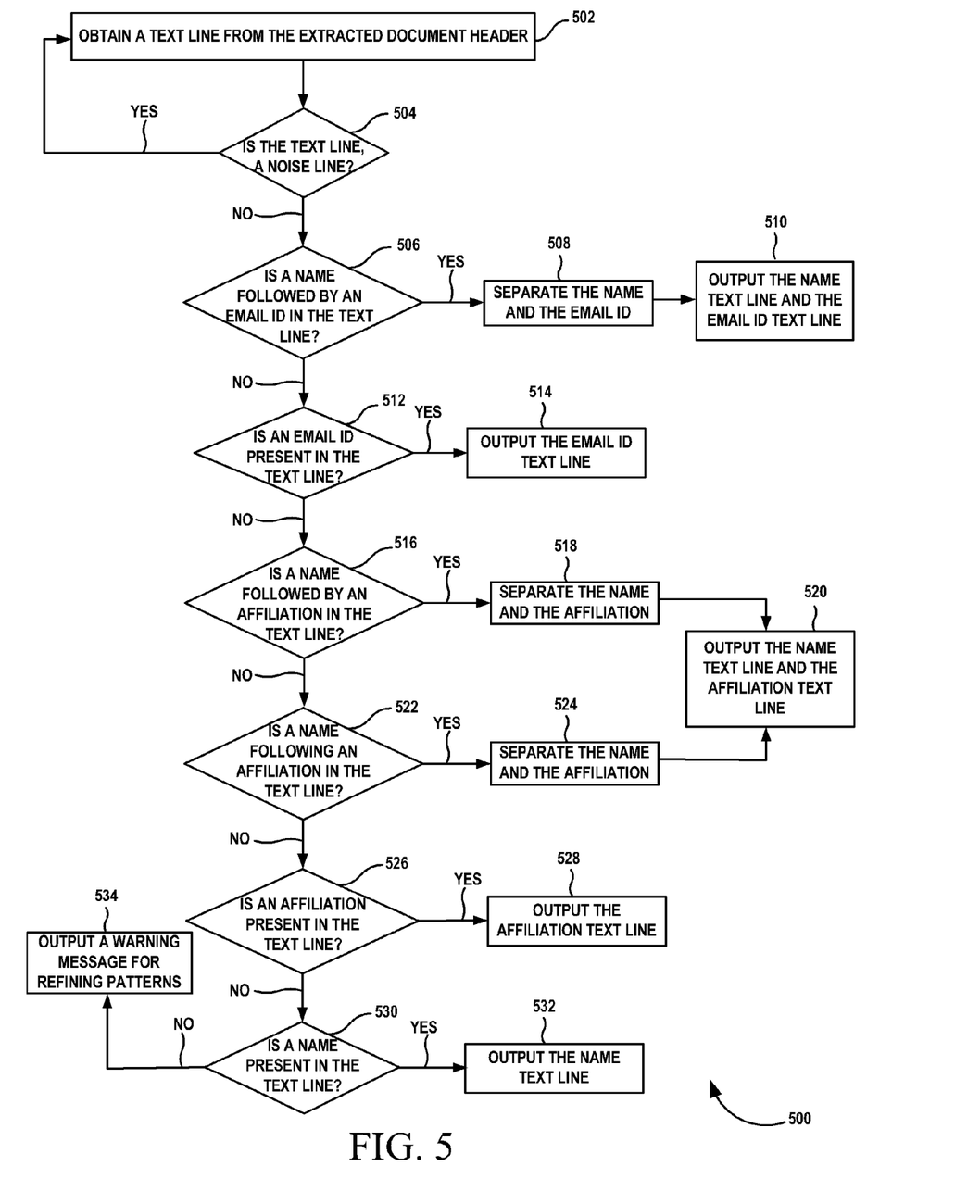
FIG. 5 illustrates a computer implemented flow diagram of an exemplary method for classifying text lines from the extracted document header shown in FIG. 2, according to one embodiment.

FIG. 5 illustrates a computer implemented flow diagram 500 of an exemplary method of classifying remaining text lines from the extracted document header as shown in FIG. 2, according to one embodiment. Particularly, FIG. 5 illustrates an exemplary process of classifying remaining text lines into different categories and extracting names of authors, affiliations and email IDs from each of the different categories of the classified remaining text lines based on a pattern-based technique, as illustrated in steps 108B and 108C of FIG. 1.

At step 502, a text line is obtained from the extracted document header. At step 504, it is determined whether the text line is a noise text line. For example, the noise line is a text line which is mistakenly considered as belonging to the document header. The noise text line may include a date text line, a page number text line, a copyright text line and the like. If, at step 504, it is determined that the text line is the noise text line, then the step 502 is repeated, else step 506 is performed.

At step 506, it is determined whether a name of author is followed by an email ID in the text line. The determination in step 506 may be made using a set of predefined name patterns and email ID patterns. For example, the determination may check whether the text line is in a pattern [John Smith, {john@abc.com}]. If it is determined that the name of author is followed by the email ID in the text line, then at step 508, the name of the author and the email ID in the text line are separated. Further, the name of author text line and the email ID text line are outputted, at step 510. If it is determined that the name of author is not followed by the email ID in the text line, then step 512 is performed.

At step 512, it is determined whether an email ID is present in the text line. The determination in step 512 may be made using a set of predefined email ID patterns. For example, the determination may check whether the text line is in a pattern—{john @abc.com}. If it is determined that the email ID is present in the text line, then the email ID text line is outputted at step 514. If it is determined that the email ID is not present in the text line, then step 516 is performed. At step 516, it is determined whether a name of author is followed by an affiliation in the text line. The determination in step 516 may be made using a set of predefined name patterns and a predefined list of common affiliation words. For example, the determination may check whether the text line is in a pattern [John Smith, University of ABC]. If it is determined that the name of the author is followed by the affiliation in the text line, then the name of author and the affiliation in the text line are separated at step 518. Further, the name of author text line and the affiliation text line are outputted at step 520.

If it is determined that the name of the author is not followed by the affiliation in the text line, then step 522 is performed. At step 522, it is determined whether a name of author is following an affiliation in the text line. The determination in step 522 may be made using a set of predefined name patterns and a predefined list of common affiliation words. For example, the determination may check whether the text line is in a pattern [University of ABC, John Smith]. If it is determined that the name of author is following the affiliation in the text line, then the name of author and the affiliation in the text line are separated at step 524. Further, the name of author text line and the affiliation text line are outputted at step 520. If it is determined that the name of author is not following the affiliation in the text line, then step 526 is performed.

At step 526, it is determined whether an affiliation is present in the text line. The determination in step 526 may be made using a predefined list of common affiliation words. For example, the determination may check whether the text line is in a pattern [University of ABC]. If it is determined that the affiliation is present in the text line, then the affiliation text line is outputted at step 528. If it is determined that the affiliation is not present in the text line, then step 530 is performed. At step 530, it is determined whether a name of author is present in the text line. The determination in step 530 may be made using a set of predefined name patterns. For example, the determination may check whether the text line is in a pattern [John Smith]. If it is determined that the name of author is present in the text line, then the name of author text line is outputted at step 532. If it is determined that the name of author is not present in the text line, then step 534 is performed. At step 534, a warning message is outputted to a user for refining patterns. For example, at step 534, a system administrator may be notified in case the text line doesn't match one or more existing patterns.

Figure 6:
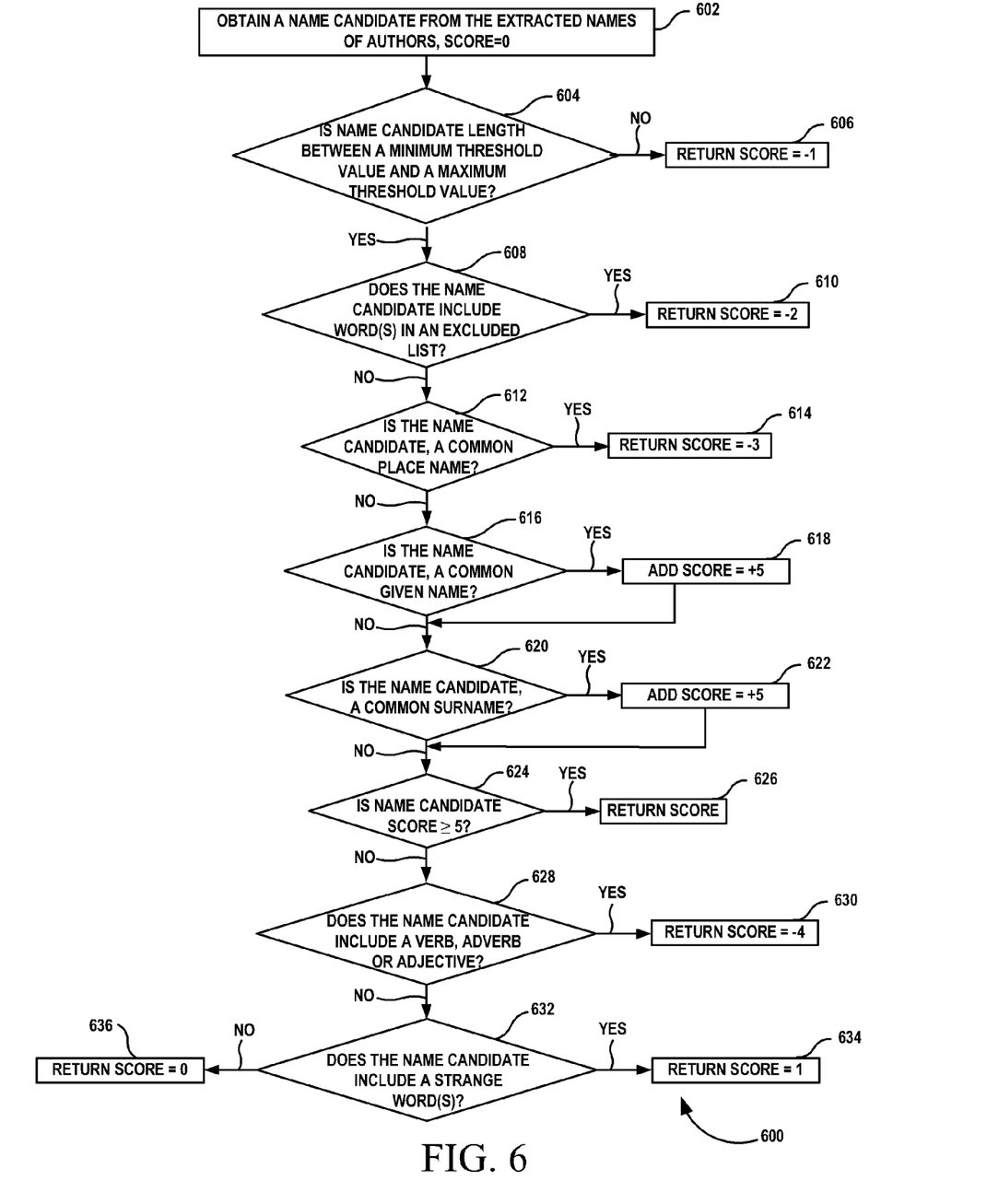
FIG. 6 illustrates a computer implemented flow diagram of an exemplary method for scoring a name candidate associated with a name of author extracted from the extracted document header shown in FIG. 2, according to one embodiment.

FIG. 6 illustrates a computer implemented flow diagram 600 of an exemplary method of scoring a name candidate associated with a name of author extracted from the extracted document header as shown in FIG. 2, according to one embodiment. According to an embodiment of present invention, a name candidate, which is one of the extracted names of authors, is given a score based on a prior knowledge about person names, which may include a list of common given names, a list of common surnames, a list of common place names, a list of excluded words, that should not appear in person names, a dictionary having part-of-speech of words, and the like. The method of scoring the name candidate may help filter out invalid names of authors which are extracted using the pattern-based technique described in FIG. 1.

At step 602, a name candidate is obtained from the extracted names of authors. At this point, a score assigned to a name candidate is zero. At step 604, it is determined whether length of the name candidate is between a minimum threshold value and a maximum threshold value. For example, the minimum threshold value may be one word and the maximum threshold value may be four words. If it is determined that the length of the name candidate is not between the minimum threshold value and the maximum threshold value, then a score of minus one is returned at step 606. If it is determined that the length of the name candidate is between the minimum threshold value and the maximum threshold value, then step 608 is performed.

At step 608, it is determined whether the name candidate includes word(s) in a list of excluded words. The determination in step 608 may be made using a predefined list of non-name words, such as service, computer, and so on. If it is determined that the name candidate includes the word(s) in the list of excluded words, then a score of minus two is returned at step 610. If it is determined that the name candidate does not include the word(s) in the list of excluded words, then step 612 is performed.

At step 612, it is determined whether the name candidate includes a common place name. The determination in step 612 may be made using a predefined list of common place names, such as country names, city names, and so on. If it is determined that the name candidate includes a common place name, then a score of minus 3 is returned at step 614. If it is determined that the name candidate does not include a common place name, then step 616 is performed. At step 616, it is determined whether the name candidate includes a common given name. The determination in step 616 may be made using a predefined list of common given names, such as John, Steve, and so on. If it is determined that the name candidate includes a common given name, then a score of plus five is added at step 618 and step 620 is performed. If it is determined that the name candidate does not include a common given name, then step 620 is performed.

At step 620, it is determined whether the name candidate includes a common surname. The determination in step 620 may be made using a predefined list of common surnames, such as Smith, Bush, and so on. If it is determined that the name candidate includes a common surname, then a score of plus five is added at step 622 and step 624 is performed. If it is determined that the name candidate does not include a common surname, then step 624 is performed. At step 624, it is determined whether the name candidate has a score equal to or greater than five. For example, if the name candidate includes at least one common surname or common given name, then the name candidate can be a real name of author. If it is determined that the name candidate has a score equal to or greater than five, then the score associated with the name candidate is returned at step 626. If it is determined that the name candidate does not have a score equal to or greater than five, then step 628 is performed.

At step 628, it is determined whether the name candidate includes a verb, an adverb or an adjective. If it is determined that the name candidate includes a verb, an adverb or an adjective, then a score of minus four is returned at step 630. If it is determined that the name candidate does not include a verb, an adverb or an adjective, then step 632 is performed. At step 632, it is determined whether the name candidate includes a strange word(s) such as word(s) of vocabulary. If it is determined that the name candidate include a strange word (s), then a score of one is returned at step 634, else a score of zero is returned at step 636. It can be noted that, the name candidate with score zero may be processed with the scoring propagation mechanisms as described below.

Additional scoring propagation methods can be implemented apart from the scoring method illustrated in FIG. 6. For example, if the extracted names of authors text line includes more than one name candidates and at least one of the name candidates has a full score, then other name candidates having a score zero can be increased. For example, a name candidate having a high score and located nearby a strange name candidate may be used to promote a score of the strange name candidate. Another implementation may include score propagation based on the extracted email IDs. For example, if a number of the extracted email IDs is larger than a number of the extracted names of authors with a positive score, then the name candidates having a score zero but best matching with the extracted email IDs can be increased.

Figure 7:
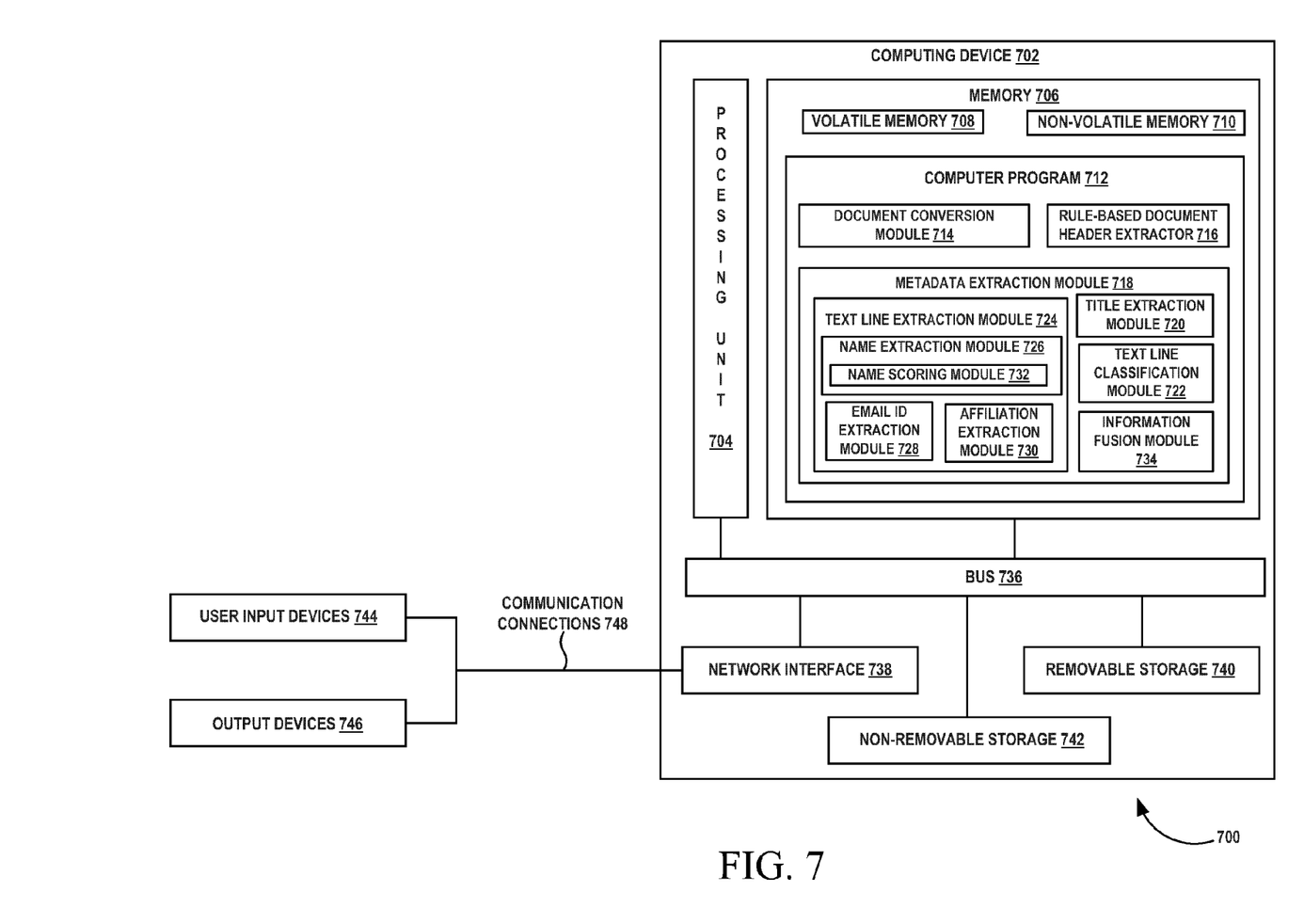
FIG. 7 illustrates an example of a suitable computing system environment for implementing embodiments of the present subject matter.

FIG. 7 shows an example of a suitable computing system environment 700 for implementing embodiments of the present subject matter. FIG. 7 and the following discussion are intended to provide a brief, general description of a suitable computing environment in which certain embodiments of the inventive concepts contained herein may be implemented.

A general computing device 702, in the form of a personal computer or a mobile device may include a processing unit 704, memory 706, a removable storage 740, and a non-removable storage 742. The computing device 702 additionally includes a bus 736 and a network interface 738. The computing device 702 may include or have access to a computing environment 700 that includes one or more user input devices 744, one or more output devices 746, and one or more communication connections 748 such as a network interface card or a universal serial bus connection.

The one or more user input devices 744 may be a digitizer screen and a stylus, trackball, keyboard, keypad, mouse, and the like. The one or more output devices 746 may be a display device of the personal computer or the mobile device. The communication connection 748 may include a local area network, a wide area network, and/or other networks.

The memory 706 may include volatile memory 708 and non-volatile memory 710. A variety of computer-readable storage media may be stored in and accessed from the memory elements of the computing device 702, such as the volatile memory 708 and the non-volatile memory 710, the removable storage 740 and the non-removable storage 742. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

The processing unit 704, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processing unit 704 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processing unit 704 of the computing device 702. For example, a computer program 712 may include machine-readable instructions capable of automatically extracting metadata from unstructured electronic documents, according to the teachings and herein described embodiments of the present subject matter. In one embodiment, the computer program 712 may be included on a compact disk-read only memory (CD-ROM) and loaded from the CD-ROM to a hard drive in the non-volatile memory 710. The machine-readable instructions may cause the computing device 702 to encode according to the various embodiments of the present subject matter.

As shown, the computer program 712 includes a document conversion module 714, a rule-based document header extractor 716 and a metadata extraction module 718. In one exemplary operation, the document conversion module 714 may convert an unstructured electronic document into a plain text document. The rule-based document header extractor 716 may extract a document header of the unstructured electronic document from the converted plain text document. In some embodiments, the rule-based document header extractor 716 may extract the document header based on a rule that includes determining a ratio of a number of words with their initial letters capitalized in a text line over a total number of words in the text line. The metadata extraction module 718 may extract metadata from the extracted document header using a heuristic approach.

In one embodiment, the metadata extraction module includes a title extraction module 720, a text line classification module 722, a text line extraction module 724 and an information fusion module 726 for extracting the metadata from the extracted document header. The title extraction module 720 may extract a title text line from the extracted document header to identify a title in the document header in the plain text document using a heuristic approach. The text line classification module 722 may classify remaining text lines in the extracted document header into different categories, such as names of authors text line, email IDs text line, affiliations text line, names of authors followed by email IDs text line, names of authors followed by affiliations text line, names of authors followed by date text line and noise text line, using the heuristic approach.

The text line extraction module 724 may extract names of authors, email IDs, and affiliations from the classified remaining text lines based on the different categories using the heuristic approach. In some embodiments, the names of authors, email IDs, and affiliations may be extracted from the classified remaining text lines using a name extraction module 726 having a name scoring module 732, an email ID extraction module 728, and an affiliation extraction module 730. In these embodiments, the name extraction module 726 may extract names of authors from the names of authors text line. Further, the name scoring module 732 may validate the extracted names of authors by assigning a score. This may help eliminate invalid names from the extracted names of authors.

The email ID extraction module 728 may extract email IDs from the email IDs text line. The affiliation extraction module 730 may extract affiliations from the affiliations text line. Based on the extracted names of authors, email IDs and affiliations, the information fusion module 734 fuses affiliations and email IDs with the corresponding names of the authors to form a record. In this manner, the metadata is extracted and outputted on the output devices 746 of the computing device 702.

For example, the one more modules described above may be in the form of instructions stored on a non-transitory computer-readable storage medium. The non-transitory computer-readable storage medium for extracting metadata from an unstructured electronic document having the instructions that, when executed by the computing device 702, may cause the computing device 702 to perform the one or more methods described in FIGS. 1-2 and 3-5.

In various embodiments, the systems and methods described in FIGS. 1-7 may enable extraction of a document header of unstructured electronic documents based on a rule-based document header extractor. The above described systems and methods may enable automatic extraction of high-quality metadata from the document header of the unstructured electronic documents using a heuristic approach. The above described systems and methods may enable faster processing of the metadata from the document header as the document header is shorter than the entire unstructured electronic document.

The above described systems and methods does not make use of labeled training dataset for extracting the metadata from the document header, thereby significantly reducing cost involved in extraction of the metadata. However, the above described systems and methods may make use of fine-grained patterns such as line-level, sentence-level or phrase-level, as opposed to coarse-grained templates such as document-level. It can be noted that, the fine-grained patterns are robust to errors introduced while converting the unstructured electronic documents in versatile document formats to a common document format. Thus, the above described systems and methods can be used for extracting metadata from the unstructured electronic document having versatile document formats based on a pattern-based technique and a prior knowledge. It can be noted that, the above described system and methods have the ability to extend fine-grained patterns and prior knowledge based on user requirement.

Although the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A computer implemented method for automatically extracting metadata from an unstructured electronic document, comprising:
   converting the unstructured electronic document into a plain text document;
   extracting, using a rule-based document header extractor, a document header of the unstructured electronic document from the plain text document based on a rule comprising:
      determining a total number of words in a text line of the plain text document;
      computing a ratio of the number of words with their initial letters capitalized in the text line over a total number of words in the text line;
      determining whether the ratio is greater than or equal to a first predetermined header threshold value;
      if so, declaring the text line as belonging to the document header and repeat the above steps for a next text line in the converted plain text document;
      if not, declaring the text line as belonging to a main text of the plain text document and repeat the above steps for the next text line of the converted plain text document till a number of main text lines becomes greater than a second predetermined header threshold value; and
   extracting metadata from the extracted document header using a heuristic approach.

2. The method of claim 1, wherein the unstructured electronic document is in a format selected from the group consisting of a word processor format, a spreadsheet format, a power point presentation format, an unstructured portable document format (PDF), and a graphics software format.

3. The method of claim 1, wherein converting the unstructured electronic document into the plain text document comprises:
   converting the unstructured electronic document into an intermediate PDF document format; and
   converting the intermediate PDF document into the plain text document.

4. The method of claim 3, further comprising:
   encoding text sizes and text styles in the converted plain text document.

5. The method of claim 1, wherein extracting the metadata from the extracted document header using the heuristic approach comprises:

extracting a title text line, a names of authors text line, an affiliations text lines and an electronic mail identifiers (email IDs) text line using the heuristic approach from the extracted document header.

6. The method of claim 5, wherein extracting the title text line from the extracted document header using the heuristic approach comprises:

determining candidate title text lines in the extracted document header based on eye-catching style characteristics selected from the group consisting of font size of the text line, bold font type of the text line, position of the text line, whether the text line is in the beginning of the extracted document header, and a single text line or fewer than a predetermined number of title text lines; and declaring the candidate title text lines in the extracted document header as a title based on the outcome of the determination.

7. The method of claim 6, wherein extracting the affiliation text line, the names of the authors text line and the email IDs text line using the heuristic approach comprises:

extracting the affiliations text line, the names of the authors text line and the email IDs text line from the remaining text lines of the extracted document header based on a pattern-based technique and a prior knowledge.

8. A non-transitory computer-readable storage medium for extracting metadata from an unstructured electronic document having instructions that, when executed by the computing device, cause the computing device to perform a method comprising:

converting the unstructured electronic document into a plain text document;

extracting, using a rule-based header extractor, a document header of the unstructured electronic document from the plain text document based on a rule comprising:

determining a total number of words in a text line of the plain text document;

computing a ratio of the number of words with their initial letters capitalized in the text line over a total number of words in the text line;

determining whether the ratio is greater than or equal to a first predetermined header threshold value;

if so, declaring the text line as belonging to the document header and repeat the above steps for a next text line in the converted plain text document;

if not, declaring the text line as belonging to a main text of the plain text document and repeat the above steps for the next text line of the converted plain text document till a number of main text lines becomes greater than a second predetermined header threshold value; and extracting metadata from the extracted document header using a heuristic approach.

9. The non-transitory computer-readable storage medium of claim 8, wherein extracting the metadata from the extracted document header using the heuristic approach, comprises:

extracting a title text line, a names of authors text line, an affiliations text line and an electronic mail identifiers (email IDs) text line from the extracted document header based on a pattern-based technique and a prior knowledge.

10. A system for automatically extracting metadata from an unstructured electronic document, comprising:

a processor; and memory coupled to the processor, wherein the memory includes:

a document conversion module for converting the unstructured electronic document into a plain text document;

a rule-based document header extractor for extracting a document header of the unstructured electronic document from the plain text document based on a rule comprising:

determining a total number of words in a text line of the plain text document;

computing a ratio of the number of words with their initial letters capitalized in the text line over a total number of words in the text line;

determining whether the ratio is greater than or equal to a first predetermined header threshold value;

if so, declaring the text line as belonging to the document header and repeat the above steps for a next text line in the converted plain text document;

if not, declaring the text line as belonging to a main text of the plain text document and repeat the above steps for the next text line of the converted plain text document till a number of main text lines becomes greater than a second predetermined header threshold value; and a metadata extraction module for extracting metadata from the extracted document header using a heuristic approach.

11. The system of claim 10, wherein the metadata extraction module comprises:

a title extraction module for extracting a title text line from the extracted document header using the heuristic approach; and a text line extraction module for extracting remaining text lines from the extracted document header using the heuristic approach, wherein the text line extraction module comprises a name extraction module for extracting a names of authors text line from the remaining text lines, and wherein the text line extraction module comprises an email ID extraction module for extracting an electronic mail identifiers (email IDs) text line from the remaining text lines, and wherein the text line extraction module comprises an affiliation extraction module for extracting an affiliations text line from the remaining text lines.

* * * * *